B. H. BRUCE.
AUTOMOBILE SIGNAL.
APPLICATION FILED JAN. 17, 1916.
1,307,038.
Patented June 17, 1919.
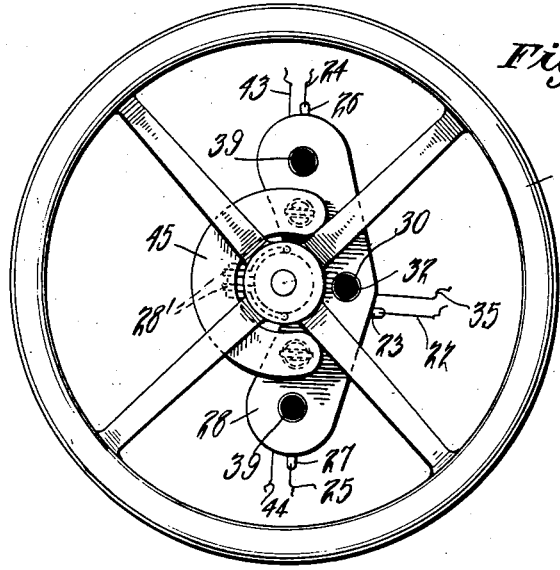
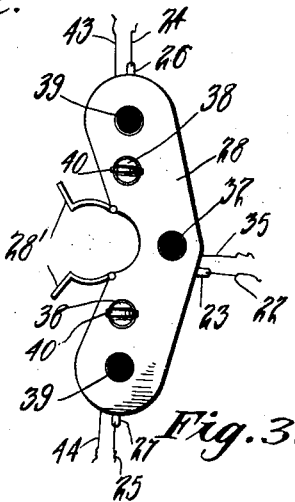
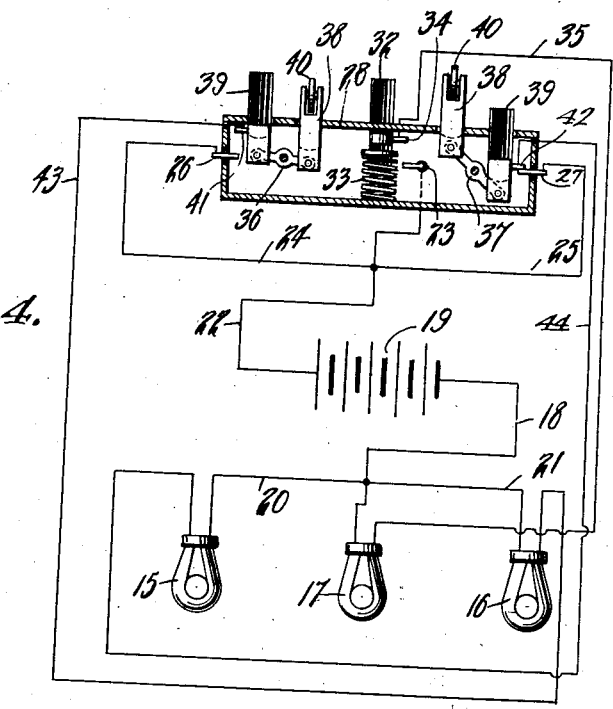
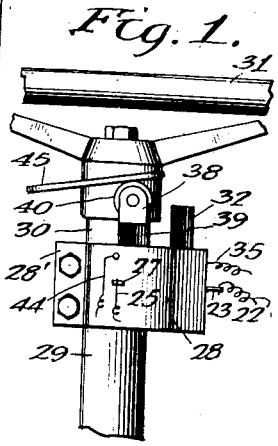
INVENTOR
Baxter H. Bruce
WITNESSES
BY
ATTORNEY

UNITED STATES PATENT OFFICE.

BAXTER H. BRUCE, OF THE UNITED STATES NAVY.

AUTOMOBILE-SIGNAL.

1,307,038.  Specification of Letters Patent.  Patented June 17, 1919.

Application filed January 17, 1916. Serial No. 72,610.

*To all whom it may concern:*

Be it known that I, BAXTER H. BRUCE, a citizen of the United States, of the United States Navy, have invented certain new and useful Improvements in Automobile-Signals, of which the following is a specification.

This invention relates to an improved automobile signal and the principal object of the invention is to provide a signal so constructed that it may be readily operated and then returned to original position with the turning of the steering wheel, a cam plate being connected with the steering wheel and positioned to engage switch buttons mounted in a switch box secured to the steering post standard.

Another object of the invention is to so construct the device that the switches may be manually operated before making a turn and then automatically returned to the original position as the turn is made.

Another object of the invention is to provide a device so constructed that if desired a turn may be made without the signal being operated.

Another object of the invention is to provide a device which will be simple in construction and very efficient in operation.

Figure 1 is a view in elevation of the steering wheel and a portion of the steering post standard, the switch and cam strip being shown in place.

Fig. 2 is a top plan view of the steering wheel, switch box and cam strip.

Fig. 3 is a top plan view of the switch box.

Fig. 4 is a diagrammatic view of the circuit used in this construction.

The device comprises three electric bulbs 15, 16 and 17. These bulbs 15 and 16 are connected with wire 18 leading from the battery 19 by means of the branch wires 20 and 21 and it will thus be seen that the battery will be in communication with all of the bulbs through the medium of these wires 18, 20 and 21. From the opposite side of the battery there leads a wire 22 which is connected with the contact point 23 and is provided with branch wires 24 and 25 leading to the contact points 26 and 27. These contacts 23, 26 and 27 are mounted in the walls of the switch box 28 which is provided with a cutout portion so that the switch box may fit closely about the standard 29 of the usual steering post 30 upon which steering wheel 31 is mounted. Clamping arms 28' are provided to removably connect the switch box with the casing as shown in Figs. 1 and 2. The push button 32 which is slidably mounted in the switch box and yieldably held in the raised position by spring 33 carries a contact point 34 with which is connected wire 35 leading from lamp 17. It will thus be seen that when the push button is pressed inwardly or downwardly the contact points 34 and 23 will engage thus completing a circuit through the lamp 17 to indicate that the automobile is about to slow down or come to a stop. Push button switches 36 and 37 are mounted in the switch box and includes plungers 38 and 39 which pass through openings in the upper wall of the switch box as shown in Fig. 4, the plungers 38 being provided with rollers 40 for a purpose to be hereinafter brought out. These plungers 39 carry contact points 41 and 42 with which wires 43 and 44 are connected, the wire 43 leading to the lamp 16 and the wire 44 leading to the lamp 15. It will thus be seen that when the push button switches are moved to bring the contacts 41 and 41 into engagement with the contacts 26 and 27, circuits will be closed thus illuminating the lamps 15 and 16.

When driving the car, the steering wheel 31 is grasped in the usual manner and if the driver is about to reduce the speed of the automobile or bring the same to a stop, the push button 32 is depressed thus closing the circuit through the lamp 17 to illuminate the same and indicate to the driver of a car following, that the car ahead is going to either stop or reduce its speed. This prevents danger of the following car colliding with the one ahead of it. If a turn is to be made to the right the plunger 39 of the switch 36 will be pressed inwardly thus closing the circuit for the lamp 16 and indicating that the car ahead is about to turn toward the right. The steering wheel will then be turned to guide the car in the proper direction and as the wheel is turned the cam plate 45 by engaging the roller 40 of switch 36 will move the plunger 38 of switch 36 downwardly thus restoring the switch to the normal position shown at the left of Fig. 6, and opening the circuit through the lamp 16. If on the other hand the turn is to be made to the left, the plunger 39 of switch 37 will be pressed downwardly as shown in Fig. 6 thus closing the circuit to lamp 15 and indicating that a turn to the left is about to be made. This will bring the roller 40 of the plunger 38 of push button switch 37 into engagement with the cam plate 45 connected with the steering wheel so that when the steering wheel is turned to turn the car to the left the plunger 38 of this switch 37 will be pressed downwardly thus opening the switch and extinguishing the light.

I have therefore provided a signal device which is very simple in construction but which is very efficient in operation, the device being so constructed that a signal can be set to indicate a turn and after the turn has been made, the circuit through the illuminated lamp broken thus extinguishing the lamp automatically.

What is claimed is:—

1. An automobile signal comprising a switch casing adapted to be clamped to an automobile steering column, stationary contact members extending into said switch casing, movable members mounted in said switch casing, contact members carried by said movable members, said movable members adapted to be manually operated to engage the second mentioned contact members, with the first mentioned contact members, reciprocating members mounted in said casing pivotally connected with the movable members, and an arcuate cam plate adapted to be carried by the automobile steering wheel for engagement with said reciprocating members upon rotation of the steering wheel to disengage the first mentioned and second mentioned contact members.

2. An automobile signal comprising a switch casing adapted to be secured to the stationary steering column of an automobile, reciprocating members mounted in said casing, contact members adapted to be engaged when said reciprocating members are in one position to complete a circuit from said source of electric power, means for returning said reciprocating members to normal position and thereby break the circuit, and means adapted to be carried by the automobile steering wheel to operate the last mentioned means upon rotation of said steering wheel.

3. In combination with a steering wheel and column, a casing secured to the column, a plurality of pairs of oppositely extending arms mounted within the casing, a button carried by one arm of each pair, a contact carried by each button, stationary contact for association with the first mentioned contact but normally out of engagement therewith, slidable blocks carried by the other arm of each pair, anti-friction means carried by each block, and a cam plate rotatable with the wheel to engage one or the other of the blocks as the case may be to restore the associated push button to normal position.

In testimony whereof I affix my signature in presence of two witnesses.

BAXTER H. BRUCE.

Witnesses:
F. R. HOLT,
ARCHER M. R. ALLEN.